United States Patent [19]

Schefer

[11] 4,142,440
[45] Mar. 6, 1979

[54] EXPANSION PLUG

[76] Inventor: Arnold Schefer, Höhenweg 396, Kappel, Switzerland

[21] Appl. No.: 813,252

[22] Filed: Jul. 6, 1977

[30] Foreign Application Priority Data

Jul. 7, 1976 [CH] Switzerland .................. 8679/76
Apr. 19, 1977 [CH] Switzerland .................. 5069/77

[51] Int. Cl.² ............................................ F16B 13/06
[52] U.S. Cl. .................................................... 85/83
[58] Field of Search ........................ 85/83, 84, 72, 82

[56] References Cited

U.S. PATENT DOCUMENTS

| 3,171,321 | 3/1965 | Fischer | 85/83 |
| 3,187,620 | 6/1965 | Fischer | 85/84 X |
| 3,236,145 | 2/1966 | Schenkel | 85/83 |
| 3,383,976 | 5/1968 | Schenkel | 85/83 X |
| 3,522,756 | 8/1970 | von Wolff | 85/83 |

FOREIGN PATENT DOCUMENTS

| 2019684 | 11/1971 | Fed. Rep. of Germany | 85/83 |
| 2430217 | 1/1976 | Fed. Rep. of Germany | 85/83 |
| 480551 | 12/1969 | Switzerland | 85/83 |
| 1124213 | 8/1968 | United Kingdom | 85/84 |

Primary Examiner—Ramon S. Britts
Attorney, Agent, or Firm—Roylance, Abrams, Berdo & Farley

[57] ABSTRACT

An expansion plug has a pair of expansion shanks separated by a slit which extends along most of the length of the plug. A receiving channel for a fastener extends within the plug and along its length. The outer surface of each shank has a plurality of teeth which do not extend beyond the cylindrical profile of the plug. A pair of locking tongues extends outwardly from the plug at an acute angle to the plug axis. The expansion shanks are connected to each other by a series of longitudinally extending and longitudinally offset frangible wall portions.

17 Claims, 8 Drawing Figures

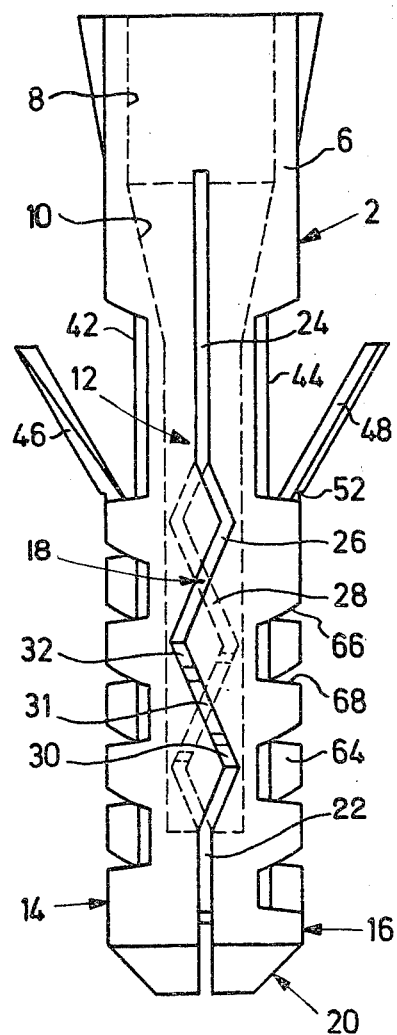
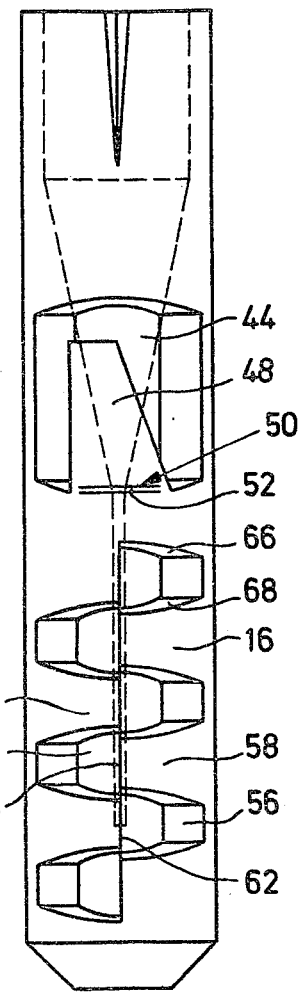
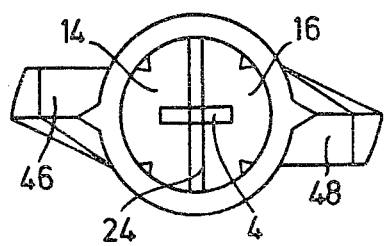

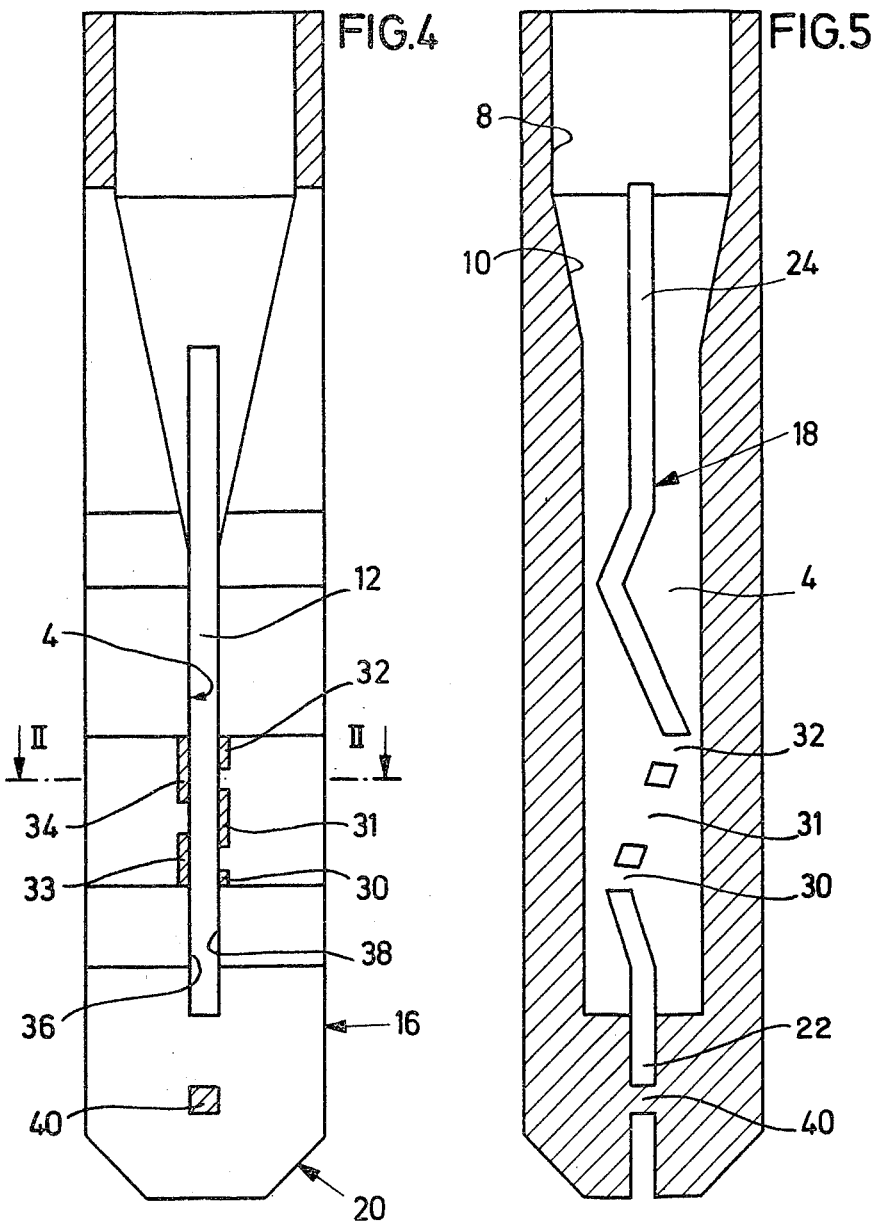
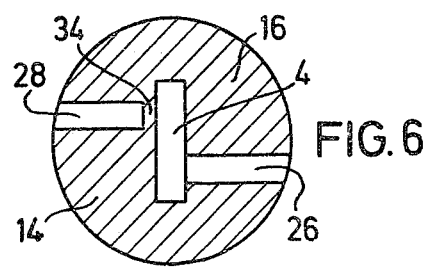

EXPANSION PLUG

This invention relates to an expansion plug.

BACKGROUND OF THE INVENTION

The separating of a plug by at least one slit into a plurality of expansion shanks carries with it the disadvantage that the plug may be so deformed when pushed into a borehole provided in the receiving material, e.g. by being kinked or bent, that the plug is prevented from being completely inserted. A mutual displacement of the expansion shanks perpendicularly of the plug axis, especially when the borehole is inaccurately made and is in a soft or non-homogeneous receiving material, deforms the receiving channel within the expansion plug, so that a fastening member can no longer be guided into it along a straight line —that is, centrally. Furthermore, when the expansion shanks are located in a soft receiving material, the insertion of the fastening member, may merely push the shanks outwardly without enabling the threads of a screw to work themselves into the material of the expansion plug to provide a secure attachment therebetween.

These disadvantages are avoided by the expansion plug of the present invention which has expansion shanks connected to each other by at least one parting region or fragile wall means extending lengthwise along the plug and bridging the slit. By means of this connection the expansion plug is considerably more resistant to kinking, bending and torsion, since the expansion shanks cannot become mutually displaced in either the perpendicular or lengthwise direction of the plug axis. These advantages are especially significant when the plug is made of a particularly elastic material, for example rubber.

Since the parting region extends lengthwise along the plug, individual portions of the parting region are, upon insertion of a fastening member such as a screw, successively parted in a zipper-like manner. This enables the receiving channel to be deformed in a novel manner upon insertion of a fastening member into the receiving channel. The expansion shanks progressively distend outwardly and the radial contact pressure builds itself up progressively as the fastening member is inserted lengthwise in the plug. This progressive deformation results in a progressive burying of the parts of the tooth-like outer profile in the surrounding receiving material.

The previously known toothlike outer profiles on expansion plugs are formed in a saw-tooth manner, so that one tooth surface runs vertically to the lengthwise axis of the plug, while the other tooth surface is at a relatively sharp angle to it. Vertical tooth surfaces have the disadvantage that upon insertion of the teeth into the receiving material, it is sheared off in certain regions and thereby forms voids by which the bonding of the plug is lessened. This is especially significant for a non-homogeneous receiving material. To avoid this disadvantage, the individual tooth surfaces are curved convexly with different positive opening angles; that is, the tooth surfaces run along the lengthwise axis of the plug at an angle of more than 90°. Due to the convex curvature with positive opening angle, the cutting edge of every tooth on the expansion shanks adjusts itself unhindered during the outward bending of the expansion shank, and does not form a nearly right angle to the lengthwise axis of the plug prior to being placed in the fully distended condition. In this way, there arises a wedge-like insertion of the teeth of the outer profile into the receiving material, so that it is pressed together without shearing. This effect is especially advantageous with the Another feature of the present invention is the arrangement of the tooth-like outer profile. The teeth on each shank are arranged in two rows which are offset with respect to each other, so that every tooth has a side bordering surface running parallel to the lengthwise axis of the plug. This prevents rotation of the plug during setting of the plug into the hole. Moreover, this arrangement of the teeth in the lengthwise plug direction permits a more even distribution of the contact pressure of the plug in the bore of the receiving material.

In order to obtain a good bonding of the expansion plug in an oversized receiving bore prior to the insertion of a fastening member, and to prevent rotation of the expansion plug in the receiving bore upon the beginning of the screwing in of a screw-like fastening member, a further feature of the invention involves the provision of locking tongues. The locking tongues extend outwardly from the shanks at an acute angle to the plug longitudinal axis. From their attachment point to the plug toward the outside, the tongues are narrowed in a wedge shape. Since by the tongues are wider at their base, their bending in a direction along the circumference of the expansion plug is prevented during rotation of a screw. Therefore no stop surface is necessary on the plug which through friction would prevent the tongues from springing outward. It is further advantageous for the outer surface of the tongues to have a curvature corresponding to that of the outer surfaces of the expansion plug, so that in their fully depressed position the tongues do not alter the outer configuration of the plug. This enables the plug to be inserted into a closely dimensioned receiving bore in a hard receiving material.

For firm plug material and/or for locking tongues with a relatively large cross section, the outward resilience of the tongues with reference to the insertion of the expansion plug in a receiving bore may be eased by the provision of a weakening groove in the base region of the tongues.

Yet another advantageous feature of this invention is the arrangement of the receiving channel for a fastening member. The channel runs to near the end of the plug tip and has side surfaces running nearly perpendicularly to the plane of the slit. The channel and slit form a cross-shaped hollow cross section of the plug. From this it follows that a cylindrical fastening member is guided centrally on being pushed or turned into the expansion plug by contact of the four inside edges of this cross-shaped hollow cross section against its perimeter surface with a screw type fastening member, the screw threads cut particularly easily into these inside edges of the expansion plug. This permits the use of screw type fastening members of differing diameter, since there is sufficient material available into which the screw threads can cut and also sufficient hollow cross section presented for displacement of material.

The portions of the slit on opposite sides of the receiving channel are preferably formed with shallow waves. The waves of the slit portions extend along the lengthwise direction of the plug and are a 180° out of phase with each other. A fastening member, upon insertion into the plug alternately comes into contact in the lengthwise direction with the wave crests of the slit, or the inner edges, and yields an enlarged expansion of the plug in a manner in itself known.

The parting regions of the present invention may consist of thin wall portions, which in the region of the inner edge or outer edge of the slits bridge over them. The wall portions hold the expansion shanks together prior to the expansion. The thin wall portions which form the parting regions may be perforated, so that the tearing open of individual segments of the parting regions can occur successively and separately without their influencing each other. The various parting region segments are preferably displaced from each other in the lengthwise direction of the plug.

In order to prevent premature deformation of the expansion plug, that is, premature expansion, three ribs extending in the lengthwise plug direction may be advantageously provided within a cylindrical receiving opening. The plug, the beginning of each of the different ribs is displaced along a thread path in the lengthwise plug direction, so that upon the pushing of a screw type fastening member into the expansion plug, a thread of the fastening member lies against the rib beginnings of the at least three ribs. This prevents premature turning of a screw type fastening member in the slitted region of the expansion plug to a premature expansion. This is a particular advantage for so-called "Durchsteckmontagen." On the other hand, the ribs are not a hindrance to the screwing in of a fastening member, since their beginning corresponds to the pitch of the screw thread.

Briefly described, the invention includes an expansion plug comprising a pair of shanks separated by at least one slit which extends along most of the length of the plug, a receiving channel for a fastener extending along the longitudinal axis of the plug, a plurality of teeth formed by indentations in the outer profile of each of the shanks to anchor the plug in a receiving material, and frangible wall means connecting the shanks across the slit which is relatively long and narrow and extends along the longitudinal axis of the plug.

In order that the manner in which the foregoing and other objects are attained in accordance with the invention can be understood in detail, a particularly advantageous embodiment thereof will be described with reference to the accompanying drawings, which form a part of this specification:

FIG. 1 is a side view of an expansion plug according to one embodiment of the present invention;

FIG. 2 is a side view of the expansion plug of FIG. 1 after being rotated 90°;

FIG. 3 is a top view of the expansion plug of FIG. 1;

FIG. 4 is a cross-sectional view of the expansion plug of FIG. 1 taken along the plane of the slit;

FIG. 5 is a cross-sectional view of the expansion plug of FIG. 1 taken along a plane perpendicular to the plane of the slit;

FIG. 6 is a cross-sectional view of the expansion plug taken along lines II—II of FIG. 4;

Figure 7:
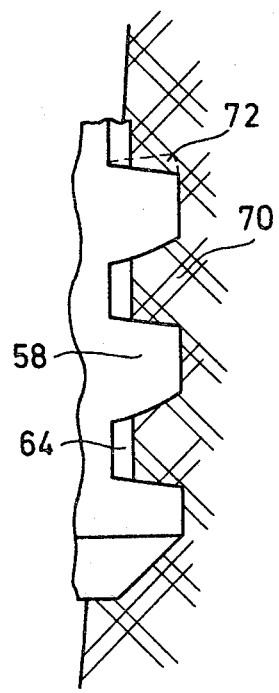
FIG. 7 is a partial cross-sectional view of an expansion shank meshing into the receiving material.

The essentially cylindrical expansion plug 2 has a receiving channel 4 extending along the greater part of its length, as the FIGS. 4 and 5 show. In the FIGS. 1 and 2 this receiving channel is indicated by broken lines. In the neck portion or top portion 6 of the plug, the receiving channel has a cylindrical inner wall 8, and goes from a conical inner wall 10 over to a channel portion 12 which extends along the greater portion of the length of the expansion shanks 14,16 of the plug.

The expansion shanks are formed by a slit 18, which extends from the plug tip 20 to the plug neck 6. The slit 18 has aligned beginning and end portions 22,24 and two wave-shaped slit portions 26,28, therebetween. The wave lines are displaced with respect to each other in the lengthwise direction, so that the crest of one slit portion lies directly across from the valley of the other in a direction perpendicular to the lengthwise plug direction, as may be deduced from the illustration of FIG. 1. The wave form is executed in a shallow zig-zag shape.

The expansion shanks 14,16 are connected to each other by individual wall portions 30 to 34 extending along the lengthwise plug direction and arranged along the inner edges 36,38 of the two slit portions 26,28. As illustrated in of FIG. 4 the wall portions 30 to 32 at the inner edge 38 are displaced in the lengthwise direction of the plug with respect to the remaining wall portions 33,34, which are arranged on the opposite edge 36. In this manner, the wall portions 31 to 34 form a parting portion extending in the lengthwise direction of the slit. In the region of the plug tip 20, the expansion shanks 14,16 are additionally connected to each other in a known manner by a crosspiece 40.

In the plug, adjacent the neck portion 6, there are two, longitudinally extending, diametrically opposite indentations 42, 44. Locking tongues 46, 48 are formed in the end of the indentations located closest to the tip 20 of the plug. These locking tongues 46,48 head ineardly upon insertion of the plug into a receiving bore and can be accommodated in the indentations 42,44. In their base region 50, the tongues 46,48 are made significantly wider, so that they do not bend sideways against forces working in a direction tangential to the plug circumference. In the base region of the tongues, there is further provided a groove 52, running in a direction perpendicular to the lengthwise plug direction, which eases the outward bending of the tongues and prevents a groove break.

As illustrated in FIGS. 1 and 2 the outside profile of the expansion shanks 14,16, between the tongues 46,48 and the plug tip 20 is formed with numerous notch-like indentations 54,56. A toothlike raised portion 58,60 is formed between neighboring indentations in the lengthwise plug direction, which does not extend beyond the outer perimeter of the plug. There are two rows of teeth on each shank 14, 16 which extend in the lengthwise plug direction (see FIG. 2). In the perimeter plug direction, a tooth-like raised portion 58 is arranged opposite an indentation 54. At the transition is found a tooth surface 62,64 running in the lengthwise plug direction which opposes plug rotation by meshing into the receiving material.

Every indentation is bounded in the lengthwise plug direction by two tooth surfaces 66,68, which are at an angle of more than 90° to the lengthwise plug axis. The lower tooth surfaces 66 are preferably curved convexly, as may be seen from the tooth surface 66 in FIG. 1. FIG. 7 shows the meshing of the raised portion 58 into the receiving material 70 and the wedge effect which results therefrom.

In the upper portion of FIG. 7 a tooth surface is indicated by the broken lines 72 which is perpendicular to the lengthwise plug axis, this embodiment is in accordance with the present level of the technology and leading to back cutting—that is, shearing of material.

Figure 8:
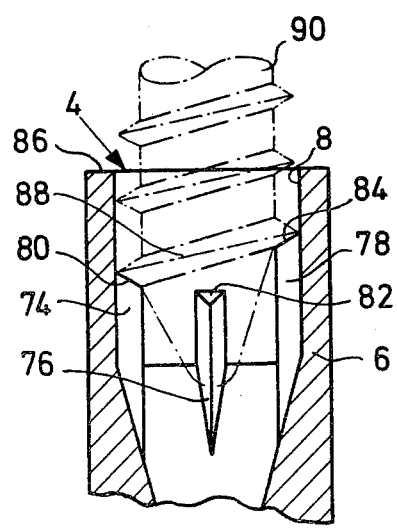
FIG. 8 is a partial cross-sectional view of the upper portion of the expansion plug.

As shown in FIG. 8, along the cylindrical wall 8 of the receiving channel 4, ribs 74, 76, 78 are provided which run in the lengthwise direction of the plug. The beginning 80, 82, 84 of the ribs 74, 76, 78 are arranged along a screw path, so that the beginnings of the ribs are correspondingly and differently spaced from the fore surface 86 of the plug. In this way, the threads 88 of a fastening member 90, indicated by broken lines in the FIG. 8, can rest against the ribs 74, 78, so that the expansion plug may with the aid of the fastening member 90 be pushed into a receiving hole without being prematurely expanded.

While a certain advantageous embodiment has been chosen to illustrate the invention, it will be understood by those skilled in the art that various changes and modifications can be made therein without departing from the scope of the invention as defined in the appended claims.

I claim:

1. An expansion plug comprising
   a pair of expansion shanks separated by at least one slit which extends along most of the length of the plug;
   a receiving channel for a fastener extending along the longitudinal axis of the plug;
   each shank having a plurality of teeth formed by indentations in its outer profile to anchor the plug in receiving material; and
   frangible wall means connecting said shanks across said slit, said well means being relatively long and narrow, the longitudinal axis of said wall means extending generally along the length of the plug, and said wall means comprising thin wall portions arranged on opposite longitudinal sides of said receiving channel so that said channel extends between opposed ones of said wall portions.

2. An expansion plug according to claim 1, wherein said wall means compises at least one thin wall portion extending perpendicularly to the plane of said slit.

3. An expansion plug according to claim 1, wherein said wall means is located intermediate the longitudinal ends of the plug.

4. An expansion plug according to claim 1, wherein said wall means is arranged adjacent the inner edges of said shanks.

5. An expansion plug according to claim 1, wherein said wall means is discontinuous.

6. An expansion plug according to claim 1, wherein each of said teeth is defined by upper and lower surfaces, and said surfaces are arranged at angles substantially greater than 90 relative to the longitudinal axis of the plug.

7. An expansion plug according to claim 6, wherein said lower tooth surfaces are curved convexly.

8. An expansion plug according to claim 1, wherein said teeth on each shank are arranged in two rows parallel to the longitudinal axis of the plug, the teeth in one row on each shank being offset in the direction of the plug longitudinal axis relative to the teeth of the other row on the same shank, so that each tooth has a side bordering surface extending parallel to the plug longitudinal axis.

9. An expansion plug according to claim 1, wherein at least two locking tongues are attached on said shanks and extend outwardly from said shanks at an acute angle relative to the plug longitudinal axis, said tongues taper in width so that they are wider at their attachment to the shanks and narrower at their free ends.

10. An expansion plug according to claim 9, wherein the outer surface of the plug is cylindrical and the outer surfaces of said tongues are curved with a radius of curvature equal to that of said plug outer surface.

11. An expansion plug according to claim 9, wherein weakening grooves are provided in said tongues adjacent to their attachments to said shanks which extend generally transverse to the plug longitudinal axis.

12. An expansion plug according to claim 9, wherein indentations are formed in said shanks adjacent to said tongues to receive said tongues when said tongues are resiliently pivoted into said indentations.

13. An expansion plug according to claim 1, wherein said receiving channel extends from the top of the plug to near the bottom of the plug and has side surfaces along the majority of its length which are approximately perpendicular to the plane of said slit, said slit and said channel cross approximately at their midpoints to form a cross-shaped hollow cross section.

14. An expansion plug according to claim 13, wherein said receiving channel, adjacent the top of the plug, has a cylindrical inner wall and a conical inner wall between said cylindrical inner wall and said side surfaces providing a transition portion therebetween.

15. An expansion plug according to claim 1, wherein said slit is of substantially constant width and is divided into two longitudinal portions separated by said receiving channel, said longitudinal portions have straight, aligned beginning and end portions which are parallel with the plug longitudinal axis and have wave-shaped portions between the beginning and end portions, said wave-shaped portion of one of said longitudinal portions being 180 out of phase relative to said wave-shaped portion of the other side longitudinal portion.

16. An expansion plug according to claim 1, wherein the inner surface of said receiving channel adjacent the top of the plug has at least three inwardly projecting ribs which extend for a predetermined distance in said channel parallel to the plug longitudinal axis, the uppermost portion of each rib being displaced along the plug longitudinal axis from the uppermost portions of the other of said ribs.

17. An expansion plug comprising
   a pair of expansion shanks separated by at least one slit which extends along most of the length of the plug;
   a receiving channel for a fastening extending along the longitudinal axis of the plug;
   each shank having a plurality of teeth formed by indentations in its outer profile to anchor the plug in receiving material; and
   frangible wall means connecting said shanks across said slit, said wall means being relatively long and narrow, the longitudinal axis of said wall means extending generally along the length of the plug, and said wall means comprising a plurality of wall portions arranged on each side of said receiving channel, and displaced along the longitudinal axis of the plug relative to each other.

* * * * *